Feb. 24, 1942.  E. O. COATS  2,274,320
MACHINE FOR RECOVERING CARBON
Filed May 14, 1940  2 Sheets-Sheet 1
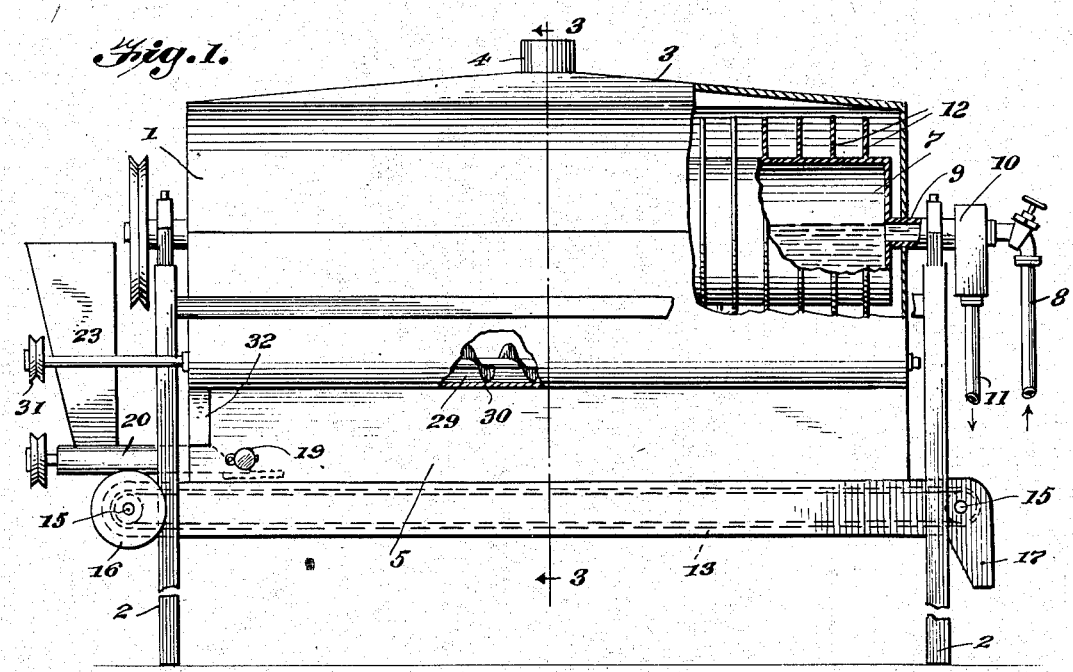
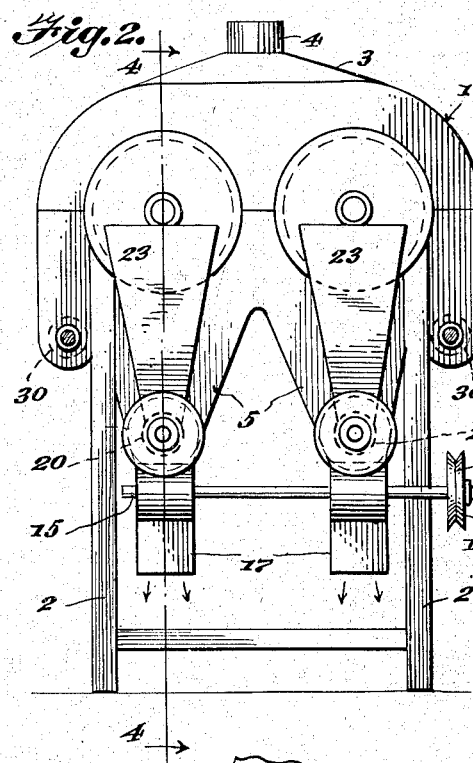
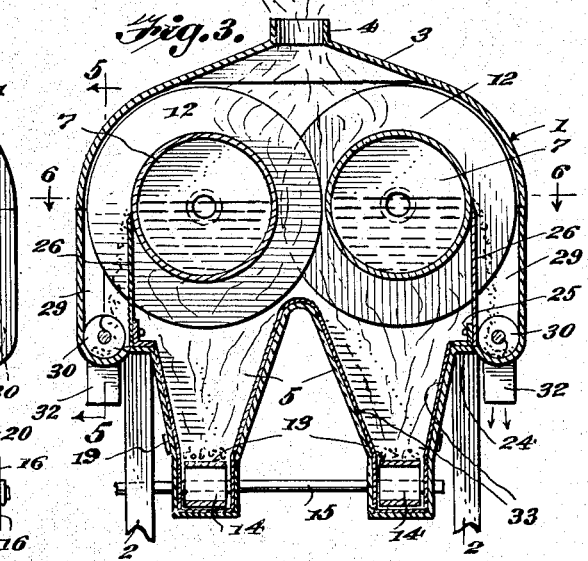
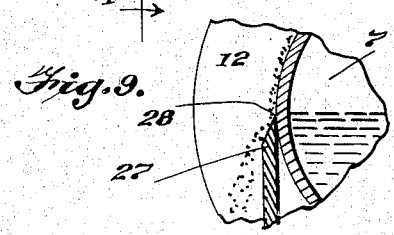
Inventor,
EDWARD O. COATS.

Feb. 24, 1942.   E. O. COATS   2,274,320
MACHINE FOR RECOVERING CARBON
Filed May 14, 1940   2 Sheets-Sheet 2
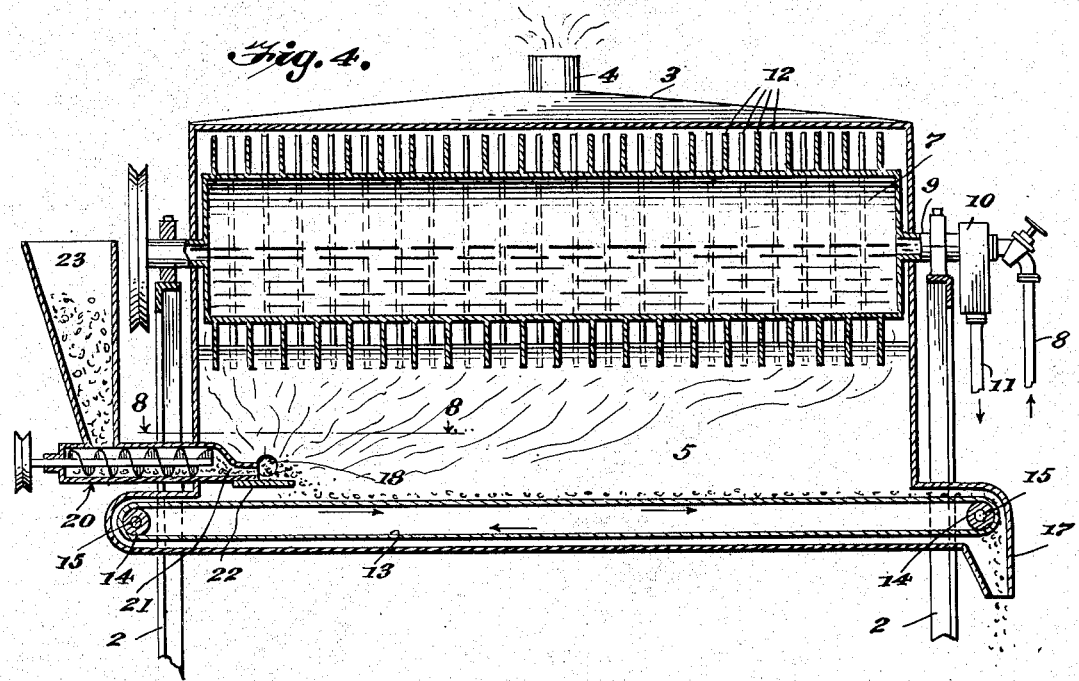
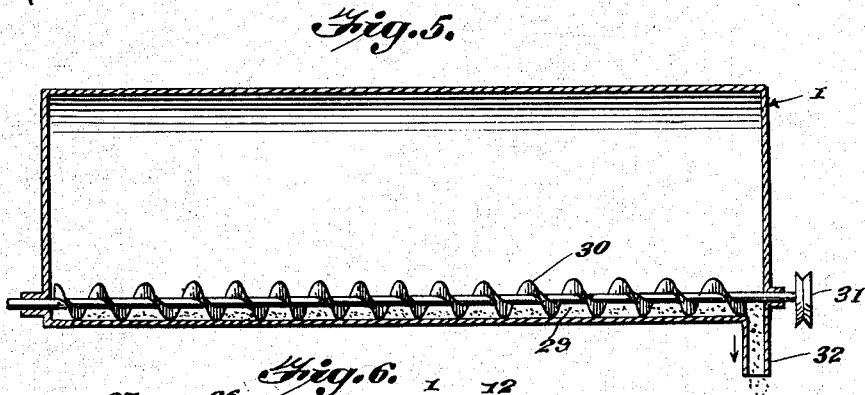
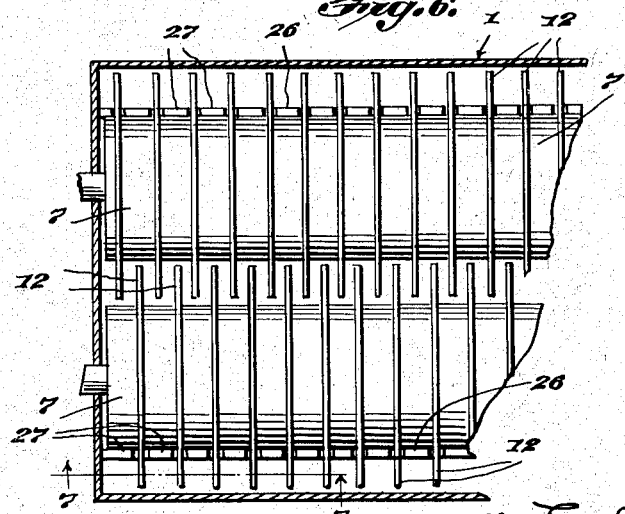
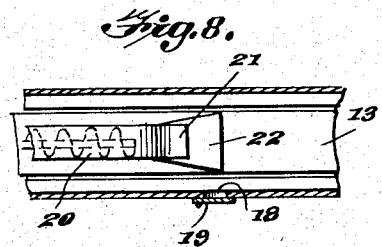
Inventor,
EDWARD O. COATS.

Patented Feb. 24, 1942

2,274,320

UNITED STATES PATENT OFFICE 2,274,320

MACHINE FOR RECOVERING CARBON

Edward O. Coats, Warrensburg, Mo., assignor to The Do-All Products Company, Incorporated, Leavenworth, Kans., a corporation of Kansas Application May 14, 1940, Serial No. 335,196

5 Claims. (Cl. 23—259.7)

This invention relates to a machine for recovering carbon.

It is to be understood that waste materials, such as used automobile tires contain a large percent of carbon or gas black, which is recoverable and suitable for again compounding with rubber, or for other uses to which a carbon black is suitable. It has also been discovered that, after giving up the combined carbon, the rubber forms another type of carbon, which is desirable for many other uses in the arts.

Therefore, an object of this invention is the provision of simple and efficient means for separating the carbon from the waste material, collecting the carbon, passing the impurities off in the fumes, carbonizing the rubber and collecting same for further use.

Another object of the invention is the construction of a novel and efficient machine for receiving suitable material to be exploded, and then collecting the carbon on cooled cylinders or drums, from which the carbon is scraped in a novel manner and carried by preferably screw conveyers, to be discharged at one end of the machine.

With the foregoing and other objects in view, the invention comprises certain novel constructions, combinations, and arrangements of parts as will be hereinafter fully described, illustrated in the accompanying drawings, and more particularly pointed out in the appended claims.

In the drawings:

Figure 1 is a view in side elevation, and partly in longitudinal section, of a machine constructed in accordance with the present invention.

Figure 2 is an elevated front view of the machine.

Figure 3 is a sectional view taken on line 3—3, Figure 1, and looking in the direction of the arrows.

Figure 4 is a sectional view taken on line 4—4, Figure 2, and looking in the direction of the arrows.

Figure 5 is a sectional view taken on line 5—5, Figure 3, and looking in the direction of the arrows.

Figure 6 is a sectional view taken on line 6—6, Figure 3, and looking in the direction of the arrows.

Figure 7 is a sectional view taken on line 7—7, Figure 6, and looking in the direction of the arrows.

Figure 8 is a sectional view taken on line 8—8, Figure 4, and looking in the direction of the arrows.

Figure 9 is a sectional view taken on line 9—9, Fig. 7.

Referring to the drawings, in which I have shown the preferred embodiment of my invention, 1 designates the primary casing which is supported upon suitable legs 2. The casing 1 is provided with a hood or top 3, which has an outlet 4 that is shown at the middle of the hood, but could be placed at either end, as the operator desires, without departing from the spirit and scope of this invention. The bottom of the primary casing 1 is W-shaped, as will be clearly seen upon referring to Figure 3. This bottom divides the lower portion of the primary casing 1 into two combustion compartments 5. In the upper part of casing 1 is a condenser compartment 6. In the condenser compartment are two hollow condensing cylinders 7. Each cylinder is adapted to contain water, for cooling purposes, and the water is supplied to the cylinder through a valved inlet pipe 8 and the water is exhausted from the cylinder through outlet pipe 9, tank 10 and pipe 11. Each hollow cylinder 7 is provided on its outer surface with disc-like fins 12, which fins increase the area of surface exposed to the collection of carbon. The fins 12 of one cylinder overlap the fins on the opposite cylinder (see Figs. 3 and 6).

In the bottom portions of the two combustion compartments 5 are metal conveyors 13; these belt-conveyors are mounted upon rollers 14 (Fig. 3) and these rollers 14 are fixedly secured to transverse shafts 15. The shaft 15 at the left hand end of the machine is provided with a pulley or belt wheel 16. At the right hand end of the casing 1, contiguous to each of the two belt-conveyors 13 is a discharge spout 17. On both sides of the primary casing 1, contiguous to and opening into the combustion compartments is an aperture 18, that is closed by a pivoted flap 19.

Two conveyor casings 20 are placed at the left hand end of the casing and extend into the casing, with the flat nozzles 21 discharging over the belt conveyors 13 (Figs. 4 and 8). By flattening the inner end of the nozzle 21 the material is spread out in the form of a ribbon as it is discharged into the combustion chamber for the efficient operation of a machine. Directly under each nozzle 21 is a flat ignition shelf-plate 22. Therefore, as the material is delivered upon the shelf-plate 22 in a thin wide spread, the material can be lighted by extending a match or suitable flame through the aperture 18 and the few particles will be ignited and will pause long enough to ignite the incoming particles before falling off the shelf-plate on to the moving conveyor. Each conveyor casing 20 is provided with a feed hopper 23 in which is deposited a suitable treated body of fine rubber material, which material may be made by grinding up old automobile tires after the cotton or other fabric has been removed, leaving preferably the old rubber to be utilized in the machine. It will be seen that ignition can be transferred more rapidly from between particles, to a thin, even layer of material than when the material is allowed to pile up, as in a pile, only the surface particles get enough oxygen to sustain combustion, and the underlying particles are smothered or choked, thus interfering with a complete carbonization. It is, therefore, very important to proper processing, that each particle of material be ignited before leaving the ignition plate 22, to finish combustion on the conveyor belt 13, as complete and uniform carbonization of the material depends upon a thick evenly spread flow, of ignited particles being deposited on the conveyor belt, as it passes the outer end of the ignition plate 22.

The exploding of the particles at the ignition plate, in both compartments 5, causes the fumes to rise and pass around and against the surfaces of the hollow cylinders 7 and fins 12, whereupon the carbon collects in great quantities. To remove the carbon from the cylinders and fins in an efficient manner, I mount on flat ledges 24 angle brackets 25. Each angle bracket 25 is fastened to a vertical scraper 26 (Figs. 3 and 7); each scraper is provided with fingers 27 that extend up between the fins 12. Each finger is provided with a cutting edge 28 that cuts or removes the carbon from the surface of the cylinder 7, and the side-edges of each finger also removes the carbon from off the discs or fins 12. The carbon falls down into the carbon compartments 29 and comes in contact with the screw discharge conveyors 30. Each conveyor 30 is driven in any suitable manner through pulley or belt wheel 31. At the opposite end of pulley or belt wheel of the conveyor is a discharge spout 32 (Fig. 5), whereby the carbon is discharged outside of the machine, and by placing a suitable receptable under each spout 32 the carbon can be conveniently collected, as the operator desires.

The W-shape bottom of casing 1 is provided with an inner lining 33, (Figure 3), preferably of asbestos, or any other heat resisting material.

In my co-pending application, "Process for recovering carbon," I have explained in more detail the material used and the manner of combining the oil therewith, so that it is not necessary to go into details in this specification as to the process. In referring to the material, or materials, deposited in the feed hoppers 23, I do so in a broad sense, so far as this machine case is concerned.

By utilizing the novel construction of the condensing cylinders, the W-shape bottom, producing two combustion compartments, and the casing walls and the two vertical scrapers, producing two carbon compartments, I have produced a very efficient and valuable machine, in that the capacity of production is vastly increased over the production of machines in the art prior to my invention.

I have not shown belts, gears, chains, etc. that may be used in connecting the pulleys or belt wheels on the ends of the two condenser cylinders, the two feed conveyors and the two carbon discharging conveyors, for any common or ordinary means may be utilized in driving these units of my machine in timed relation, for accomplishing the desired results.

While I have described the preferred embodiment of my invention and illustrated the same in the accompanying drawings, certain changes or alterations may appear to one skilled in the art to which this invention relates during the extensive manufacture of the same, and I, therefore, reserve the right to make such changes or alterations as shall fairly fall within the scope of the appended claims.

What I claim is:

1. In a machine of the class described, the combination of a casing provided with a condenser compartment in its upper portion, said casing being provided in its bottom portion with two combustion compartments, said casing being provided at its sides with two carbon collecting compartments, hollow condenser units in said condenser compartment, each of said condenser units being above a combustion compartment, a conveyer in the bottom of each combustion compartment, a nozzle near the inlet of each combustion compartment and above the said conveyer therein, said nozzle being provided with means for discharging material on said conveyor over its full width, means for supplying material to said nozzle, and conveyers in said carbon collecting compartments adapted to discharge carbon outside of said casing.

2. In a machine of the class described, the combination of a casing provided with a conveyor, a second conveyor extending through a portion of said casing above said first-mentioned conveyor, said conveyor extending through a portion of said casing and being provided at its inner end with a nozzle, a flat ignition shelf-plate under said nozzle and above said first-mentioned conveyor, a condensing unit in said casing, and means for removing carbon from said condensing unit and depositing the carbon on the outside of said casing.

3. In a machine of the class described, the combination of a casing provided in its bottom with a belt conveyor, a screw conveyor including a casing above said belt conveyor, said last-mentioned casing being flattened at its inner end, producing a horizontally-elongated nozzle for spreading a ribbon-like body of material, a flat ignition shelf-plate under said nozzle and being adapted to receive said ribbon-like body of material, said casing being provided with an aperture in its side registering with said shelf-plate, and means above said belt conveyor for collecting carbon and discharging the same outside of said first-mentioned casing.

4. In a machine of the class described, the combination of a casing, of a plurality of hollow cylinders provided with fins within said casing, a plurality of scrapers extending between said fins and bearing against said cylinders, said casing being provided with means for receiving carbon from said cylinders and discharging same outside of said casing, belt conveyors under said cylinders, and conveyors provided with nozzles extending into said casing and discharging above said belt conveyors, and said last-mentioned conveyors being provided with ignition plates under said nozzles.

5. In a machine of the class described, the combination of a casing provided in its bottom with a belt conveyor, a conveyor casing extending through one end of said casing and having its inner end flattened producing a horizontally-elongated nozzle above said belt conveyor, a shelf-plate under the inner flattened end of said conveyor casing and of the same width as said belt conveyor, said casing being provided with a horizontal valve-closed aperture registering with the inner flat end of said conveyor casing and with said shelf-plate, a conveyor in said conveyor casing, and means above said belt conveyor for collecting carbon and discharging the same outside of said casing.

EDWARD O. COATS.